United States Patent
Siegrist et al.

(10) Patent No.: US 7,203,188 B1
(45) Date of Patent: Apr. 10, 2007

(54) VOICE-CONTROLLED DATA/INFORMATION DISPLAY FOR INTERNET TELEPHONY AND INTEGRATED VOICE AND DATA COMMUNICATIONS USING TELEPHONES AND COMPUTING DEVICES

(75) Inventors: Joseph Siegrist, Vienna, VA (US); Michael Masinick, Woodbridge, VA (US)

(73) Assignee: Estara, Inc., Reston, VA (US)

( * ) Notice: Subject to any disclaimer, the term of this patent is extended or adjusted under 35 U.S.C. 154(b) by 929 days.

(21) Appl. No.: 10/151,036

(22) Filed: May 21, 2002

Related U.S. Application Data

(60) Provisional application No. 60/291,970, filed on May 21, 2001.

(51) Int. Cl.
*H04L 12/66* (2006.01)
*H04L 12/54* (2006.01)
*H04L 12/28* (2006.01)
*H04L 12/56* (2006.01)
*H04M 1/64* (2006.01)

(52) U.S. Cl. ............ 370/352; 370/429; 370/412; 379/88.01; 379/88.17

(58) Field of Classification Search ........ 370/352–356; 379/88.01, 88.04, 88.17
See application file for complete search history.

(56) References Cited

U.S. PATENT DOCUMENTS

| | | | |
|---|---|---|---|
| 5,664,061 A | 9/1997 | Andreshak et al. |
| 5,799,063 A | 8/1998 | Krane |
| 5,802,526 A | 9/1998 | Fawcett et al. |
| 5,819,220 A | 10/1998 | Sarukkai et al. |
| 5,884,262 A | 3/1999 | Wise et al. |
| 5,915,001 A | 6/1999 | Uppaluru |
| 5,953,392 A | 9/1999 | Rhie et al. |
| 6,029,135 A | 2/2000 | Krasle |
| 6,069,890 A | 5/2000 | White et al. |
| 6,078,886 A | 6/2000 | Dragosh et al. |
| 6,088,731 A | 7/2000 | Kiraly et al. |
| 6,098,043 A | 8/2000 | Forest et al. |
| 6,101,472 A | 8/2000 | Giangarra et al. |
| 6,101,473 A | 8/2000 | Scott et al. |
| 6,105,055 A | 8/2000 | Pizano et al. |
| 6,115,686 A | 9/2000 | Chung et al. |
| 6,125,376 A | 9/2000 | Klarlund et al. |
| 6,138,100 A | 10/2000 | Dutton et al. |
| 6,157,705 A | 12/2000 | Perrone |
| 6,163,536 A | 12/2000 | Dunn et al. |
| 6,167,376 A | 12/2000 | Ditzik |

(Continued)

*Primary Examiner*—Chi Pham
*Assistant Examiner*—Ronald Abelson
(74) *Attorney, Agent, or Firm*—DLA Piper US LLP

(57) ABSTRACT

A communications system includes an automated voice processor such as an IVR (interactive voice response system) that can control a display associated with an end user calling the automated voice processor over a data network such as the Internet. In a preferred embodiment, the automated voice processor collects speech inputs from the end user, translates them into machine-readable symbols, stores the speech inputs in a specified format in a designated location, and generates DTMF tones which are detected by the end user terminal and cause the end user terminal to initiate a process to identify a web page to be downloaded based on the stored and translated speech inputs, and then to download desired web page. The web pages may be static (that is, the web pages may be predefined and contain static information), or may be dynamic web pages that are modified, possibly on a per-call basis.

16 Claims, 8 Drawing Sheets

U.S. PATENT DOCUMENTS 6,233,318 B1    5/2001   Picard et al.
6,418,199 B1 *  7/2002   Perrone .................. 379/88.01
6,996,609 B2 *  2/2006   Hickman et al. .......... 709/218
2002/0114287 A1 *  8/2002   Gupta et al. ................ 370/252
2002/0164000 A1 *  11/2002  Cohen et al. ............ 379/88.17

* cited by examiner

TRAVEL ITINERARY

TRAVEL DATE: JUNE 30, 2001

TRAVEL FROM: DALLAS, TX (DAL)
DEPART: 8:42 a.m.
TRAVEL TO: BOSTON, MA (BOS)
ARRIVE: 11:28 a.m.
STOPS: NONSTOP
FARE TYPE: ONE WAY
FARE CODE: Y
COST: $1,181.00

OK    Cancel

FIG. 2

VOICE-CONTROLLED DATA/INFORMATION DISPLAY FOR INTERNET TELEPHONY AND INTEGRATED VOICE AND DATA COMMUNICATIONS USING TELEPHONES AND COMPUTING DEVICES

This application claims priority from U.S. Provisional Application Ser. No. 60/291,970 filed May 21, 2001. The entirety of that provisional application is incorporated herein by reference.

BACKGROUND OF THE INVENTION

1. Field of the Invention

The present invention relates to the provision of communications services using terminal devices that include computing devices connected to packet-switched communications networks.

2. Discussion of the Background

Users of personal computers (PCs) and other general purpose digital computing devices have been able to engage in voice communications using these devices for many years. Software for enabling PC-to-PC communication over the Internet has been available since 1991. More recently, refined commercial grade products have emerged such as those offered by VocalTec, Net2Phone, Netspeak, and many others. By utilizing the Internet or other packet switched networks, such products have given rise to convergent voice and data solutions as well as created the potential for commercial applications in the realm of e-commerce.

The assignee of the present application, eStara Inc., has addressed some of the limitations of these solutions by inventing methods for installing and initializing media applications using a "thin client" model. These methods are described in U.S. patent application Ser. No. 09/272,139, entitled "Public Web Phone System," Ser. No. 09/637,805, entitled "Universal Internet Based Telephony System That Provides Ubiquitous Access For Subscribers From Any Terminal Device," and Ser. No. 09/771,993, entitled "Internet Telephony for e-Commerce." The contents of each of these applications are hereby incorporated herein by reference. These methods and processes created a particular opportunity for enabling end users to make contact with call centers operated by merchants associated with a web site by clicking on icons displayed on web pages. In particular, when such an icon is clicked, an Internet telephony call between the end user (using their terminal as an Internet phone) and a call center agent is established without requiring the end user to have any Internet telephony software previously installed on their terminal, all the while allowing the end user to remain on the merchant's web page from which the call was initiated. The resulting voice connections link an end user and a call center agent who may be using either a telephone or a voice-over-Internet enabled computer device.

One of the obvious problems in providing voice connections to link PC users to call center agents is providing caller identification in a mixed telecommunications environment, where the caller is using an Internet based or packet switched network and the call center agent is equipped with a telephone device attached to the public switched telephone network (PSTN) and a computing device that provides automated support for order entry, customer service, or other processes. These problems are addressed in commonly-owned co-pending application Ser. No. 09/771,993.

Another issue common in e-commerce interactions between customers or prospects and call center agents is a desire to share text, multimedia, or graphical data in addition to the voice interaction. There are a variety of well-known methods for "pushing" data or for "co-browsing" by two or more web users, but all of these methods depend on having a known IP address or universal resource locator (URL) for all parties to the interactive session. In the case of a mixed telephony environment as described above, an Internet telephony service may not be able to identify which call center computing device is associated with which telephone conversation. This is especially true when calls are distributed by an automated call distribution device attached to the public switched network that does not communicate data with other call center systems (such as customer relationship management software). Methods that address this issue are also disclosed in co-pending application Ser. No. 09/771,993. However, these methods do not discuss voice/data synchronization involving automated voice processing systems, such as interactive voice response systems, rather than human agents.

SUMMARY OF THE INVENTION

The present invention provides a communications system that includes an automated voice processor such as an IVR (interactive voice response system) that can control a display associated with an end user calling the automated voice processor over a data network such as the Internet. In a preferred embodiment, the automated voice processor collects speech inputs from the end user, translates them into machine-readable symbols, stores the speech inputs in a specified format in a designated location, and generates DTMF tones which are detected by the end user terminal (e.g., a PC) and cause the end user terminal to initiate a process to identify a web page to be downloaded based on the stored and translated speech inputs, and then to download desired web page. The web pages may be static (that is, the web pages may be predefined and contain static information), or may be dynamic web pages that are modified, possibly on a per-call basis.

BRIEF DESCRIPTION OF THE DRAWINGS

A more complete appreciation of the invention and many of the attendant advantages and features thereof will be readily obtained as the same becomes better understood by reference to the following detailed description when considered in connection with the accompanying drawings, wherein:

FIG. 2 is a diagram of a web page according to an embodiment of the present invention.

DESCRIPTION OF PREFERRED
EMBODIMENTS

The present invention will be discussed with reference to preferred embodiments of Internet telephony identification/synchronization applications. Specific details, such as steps in establishing the Internet telephone call and information included with icons, are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance. Still further, devices (such as servers) described herein as separate entities may be implemented on separate physical devices and/or as separate processes running on a single physical device.

Before proceeding further, it is necessary to describe various configurations and equipment that may be involved in an Internet telephone call. It is important to understand that the methods described below are just some of the possible ways in which an Internet telephone call may be initiated. Those of skill in the art will recognize that there are many other ways to initiate such a call and the present invention is not limited to any particular method of call initiation.

Figure 1:
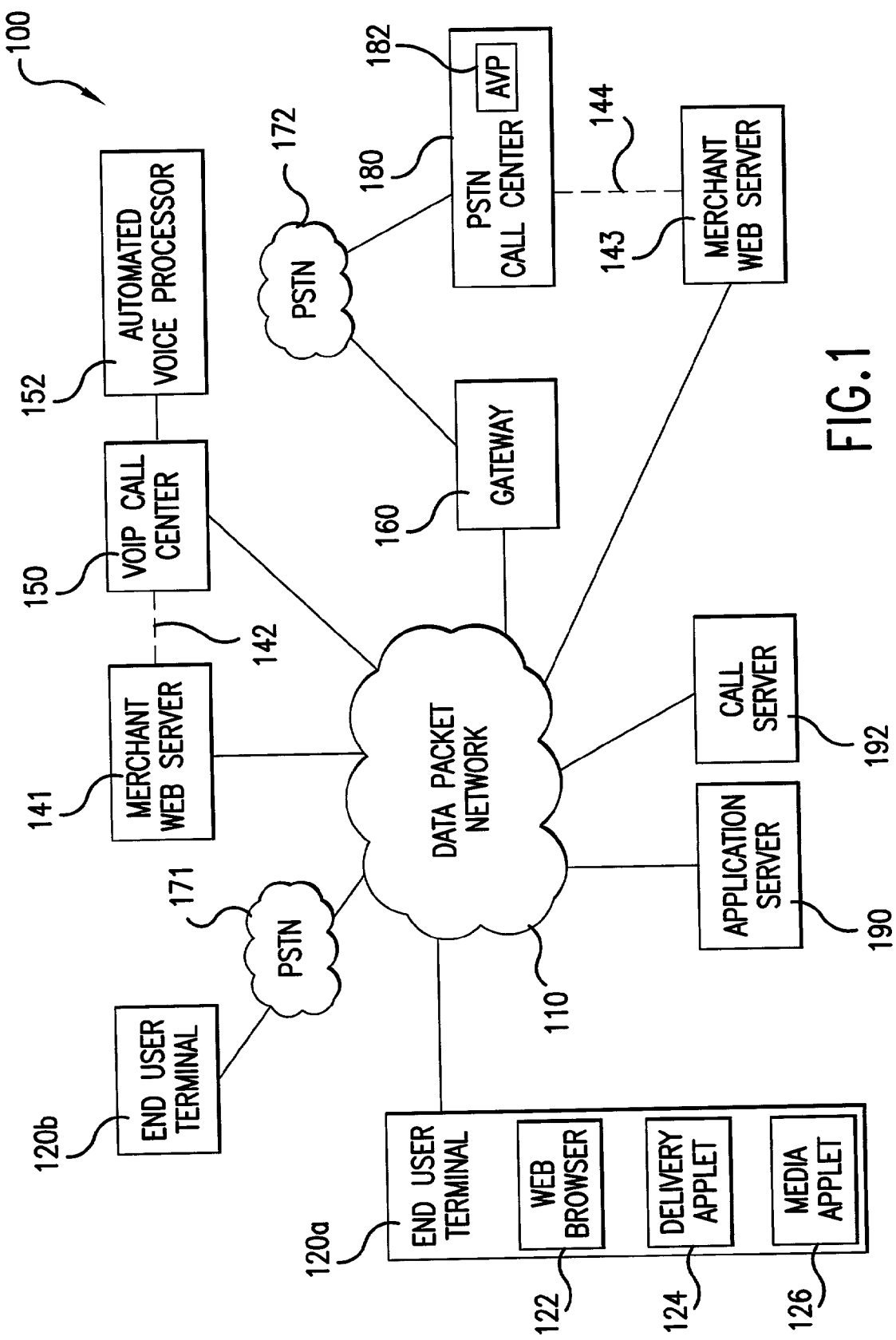
FIG. 1 is a block diagram illustrating an exemplary communication system according to one embodiment of the present invention.

Referring now to the drawings, wherein like reference numerals designate identical or corresponding parts throughout the several views, FIG. 1 illustrates a communications systems 100 including a data packet network 110 such as the Internet. Connected to the data packet network 110 are end user terminals 120a,b. End user terminal 120a is directly connected to the data packet network 110, while end user terminal 120b is connected to the data packet network 110 through the PSTN (public switched telephone network) 171 using a typical dial-up connection via a modem to an Internet service provider (not shown in FIG. 1). For the purposes of the present invention, either type of connection may be used. Each of the terminals 120 includes a web browser 122.

An end user at the terminal 120 may view web pages from a variety of sources using web browser 122 (not shown in terminal 120b solely for the sake of convenience), including merchant web servers 140,142 which are also connected to the data packet network 110. Each of the merchant web servers 140, 142 includes an icon for establishing a VoIP telephone call to an associated call center. In some embodiments, the merchant servers display directories, which may be directories of other merchants. In such embodiments, an icon may be provided for some or all entries in the directory. In preferred embodiments, the icon will include an address for an application server 190. Preferably, the icon will also include icon identification information, which may include one or more of the following: a session ID (an identifier of a browsing "session" which is assigned by the server being browsed), a customer ID (an identifier of the end user doing the browsing), a link ID (an identifier of the icon clicked on by the end user), or a telephone number associated with a call center.

When the end user at the terminal 120 clicks on the icon, a message is sent to the application server 190. In response, the application server 190 sends a delivery applet 124 to the end user terminal 120. The delivery applet will then determine whether a media application 126 is present and, if not, will obtain a media application from the application server 190 (alternatively, the media application 126 may be automatically sent with, or included in, the delivery applet 124). The media application 126 controls the low level operation (e.g., digitizing and packeting analog voice samples) of an Internet telephone call. Next, the delivery applet 124 sends a message to a call server 180 to inform the call server 180 that an Internet telephony call to a call center is desired.

When the icon is provided by the merchant web server 141, a "pure" Internet telephony call between the respective end user terminal 120 and a VoIP-ready call center 150 (which includes an Automated Voice Processor 152) associated with the merchant web server 141 (as indicated by dashed line 142) is desired. In a pure VoIP call, packets are exchanged between the respective end user terminal 120 and the call center 150 directly through the data packet network 110 without using the PSTN. When the icon is provided by merchant web server 143, the VoIP telephone call must be routed through a gateway 160 and the PSTN 172 to a conventional call center 180, which is not VoIP-ready, associated with the merchant web server 143 as indicated by the dashed line 144. Such an Internet telephone call between an end user terminal connected to the Internet and a call center connected to the PSTN shall be referred to herein as a mixed Internet telephone call.

The identification of the desired call center (which also determines whether the call will be a pure Internet telephone call or a mixed Internet telephone call) may be made in a variety of ways. In some embodiments, the icon identification information includes a phone number, which in and of itself identifies the call center. In other embodiments, a merchant ID, a link ID, or a combination of the two, are used as an index into a table maintained at the call server 192 to identify the desired call center. Other methods for determining the desired call center, including more sophisticated methods which rely on factors other than information included in the icon, such as time of day and geography, are also possible.

If the desired call center corresponds to a VoIP-ready call center 150, the call server 192 sets up the call by contacting the call center 150, informing it that a call is desired, and exchanging voice packet addresses between the media application 126 at the end user terminal 120. Once the call has been set up, the media application 126 exchanges voice packets with an AVP 152 at the call center 150.

If the desired call center corresponds to a PSTN call center 180, the call server 192 informs the gateway 160 to connect to the call center 180 via the PSTN 172. The call server then sets up an exchange of packets between the media application 126 at the terminal 120 and the gateway 160. In this situation, a packet is sent from the terminal 120 to the gateway 160. The gateway 160 unpacks the packet, converts the digital information into analog form, and transmits it to the AVP 182 at the call center 180 over the PSTN 172 (PSTN 171 and PSTN 172 may be part of the same public switched telephone network, but are shown separately in FIG. 1 for the purposes of illustration). The gateway also receives voice information in analog form from the AVP 182 at the PSTN call center 180, digitizes and packetizes the analog information, and sends the packets to the appropriate end user terminal 120.

Once the call to the appropriate call center has been established, it is necessary for the call center to process the call. The use of automated voice processors (AVPs) such as Interactive Voice Response (IVR) systems to process calls is well known in the art. In the present invention, the AVP can be extended to control the display of the caller's end user terminal 120. There are many situations where this ability may be helpful.

One example of where the invention may be utilized is in the automated completion of forms. For example, an airline's home web page may provide an icon that, when clicked on, allows the user to speak the information required to make an airline reservation. An example of such an interactive voice response system exchange might look as follows:

AVP: What is the departure city?
Customer: Dallas
AVP: What is the departure time?
Customer: 8:30 a.m.
AVP: What is the destination city?
Customer: Boston
AVP: What is the departure date?
Customer: June thirtieth.
AVP: Is this round trip?
Customer: No.

Figure 5:
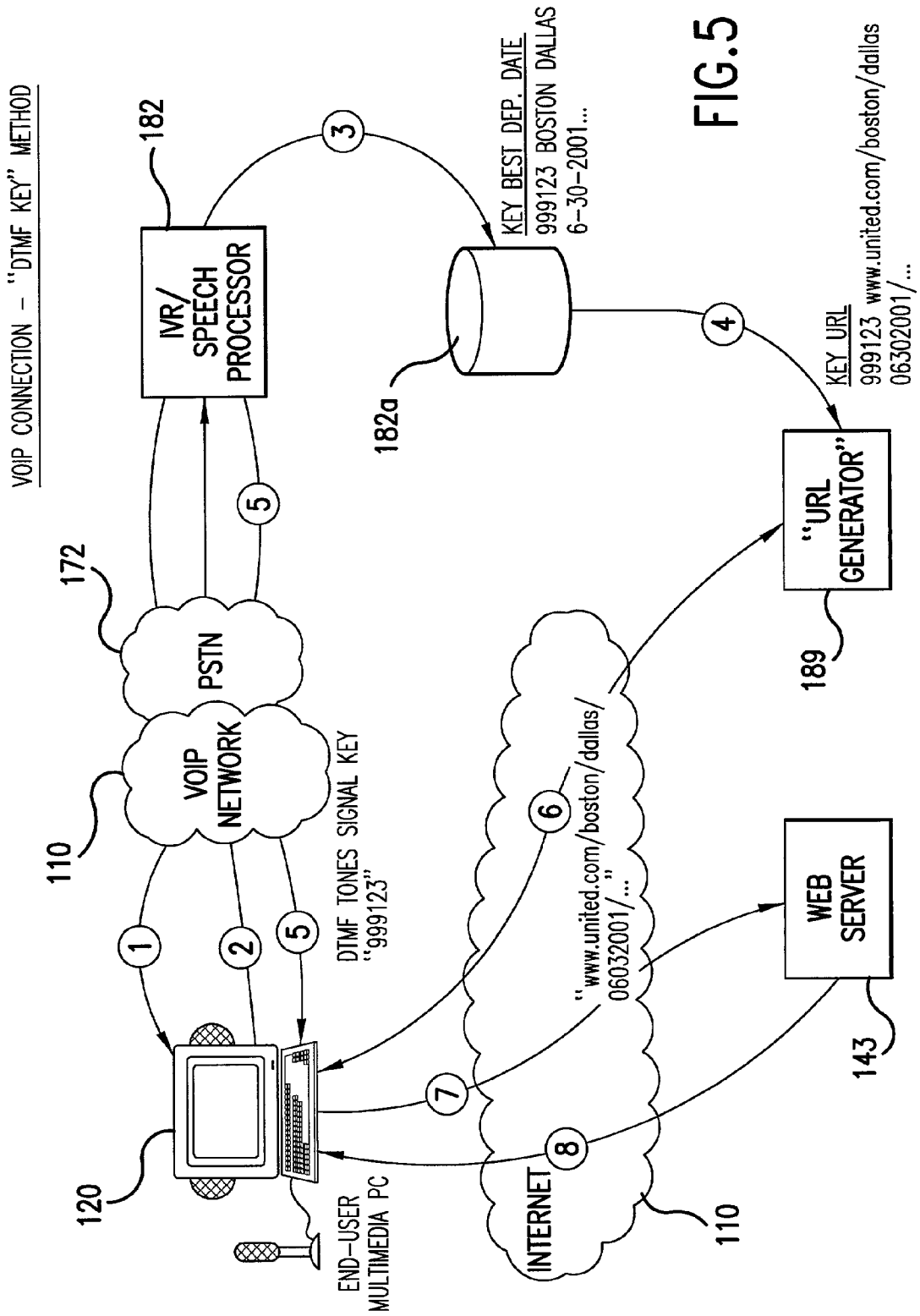
FIG. 5 is a block diagram illustrating the processing of an Internet telephone call by an automated voice processor according to a fourth embodiment of the present invention.

The processing of this exchange is illustrated by FIG. 5. At step 1 of FIG. 5, the end user terminal 120 is connected to the AVP 182 through the data packet network 110 and (via the gateway 160) the PSTN 172. The AVP 182 then prompts the end user, and, at step 2, the end user responds, in the manner discussed above. At step 3, the user's responses, which have been translated by the AVP 182 into machine-readable form, are stored in a database 182a. A key (e.g. 999123) is associated with these stored responses. At step 4, a URL generator 189 generates the customized URL needed to create the web page 200, as shown in FIG. 2, with the information from the database 182a. (The URL generator 189 may alternatively look up a URL based upon the translated responses from the end user). The AVP 182 then generates DTMF tones corresponding to the key at step 5. The DTMF tones that represent the key are detected at the end user terminal 120. The end user terminal 120 then sends the detected key to the URL generator 189 and the URL generator 189 returns the URL of the appropriate web page at step 6. At step 7, the end user terminal 120 then sends a download request to the web server 143 using the URL obtained in step 6. At step 8, the web server 143 downloads the web page to the end user terminal 120.

In the embodiment described above, the DTMF tones representing the key are digitized and included in voice packets sent to the terminal 120, where they are detected and used to retrieve a URL from the URL generator 189. It is also possible to detect the DTMF tones at the PSTN gateway 160. There are advantages and disadvantages associated with both methods. Detecting the DTMF tones at the gateway 160 requires that a standard gateway be modified to detect the tones, strip them out, and send them to terminal 120. However, detecting the DTMF tones at the gateway 160 rather than at the terminal 120 avoids the problems associated with missing portions of the DTMF tones due to packet loss an/or inaccuracies that can be caused by variations in compression technologies on the packet switched (i.e., the Internet) and circuit switched (i.e., PSTN) networks.

The foregoing is just one example of the manner in which the present invention may be used. It will be readily recognized that the information on the web page, rather than being specially prepared for a particular end user as discussed above, may be a static web page with fixed information.

Figure 6:
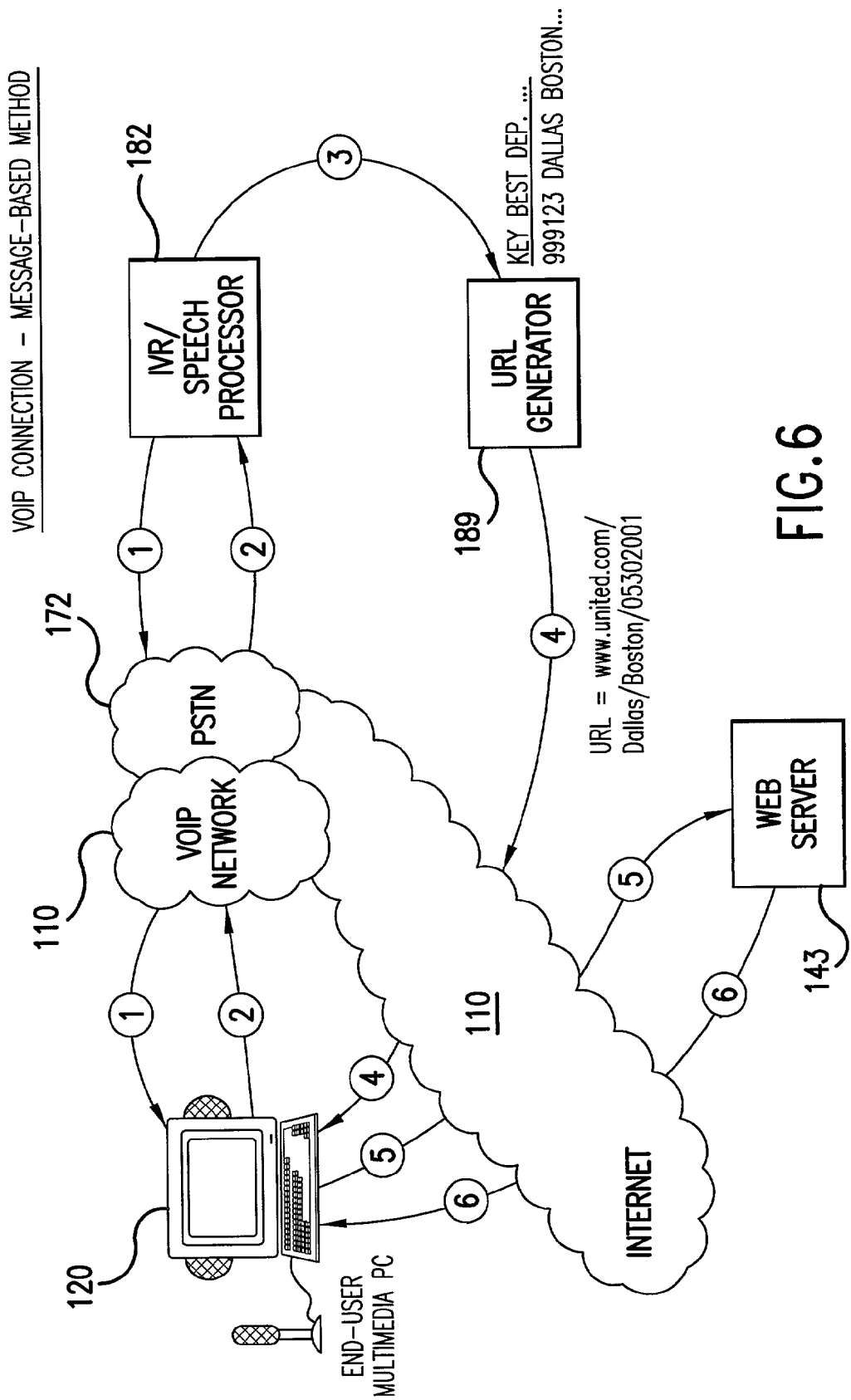
FIG. 6 is a block diagram illustrating the processing of an Internet telephone call by an automated voice processor according to a fifth embodiment of the present invention.

An alternative to the processing method of FIG. 5 is shown in FIG. 6. This method requires the AVP 182 to be modified to pass the IP address of the end user terminal 120 to the URL generator. This method begins with the end user receiving voice prompts from the AVP 182 at step 1. The end user responds to the voice prompts at step 2. The AVP 182 translates the end user responses and passes them to the URL generator 189 at step 3. The URL generator 189 generates a web page URL based on the responses and sends the corresponding URL to the end user terminal 120 at step 4. At step 5, a browser at the end user terminal 120 sends a download request with the URL to the merchant web server 143, and the merchant web server 143 downloads the desired URL to the end user terminal 120 at step 6.

Figure 7:
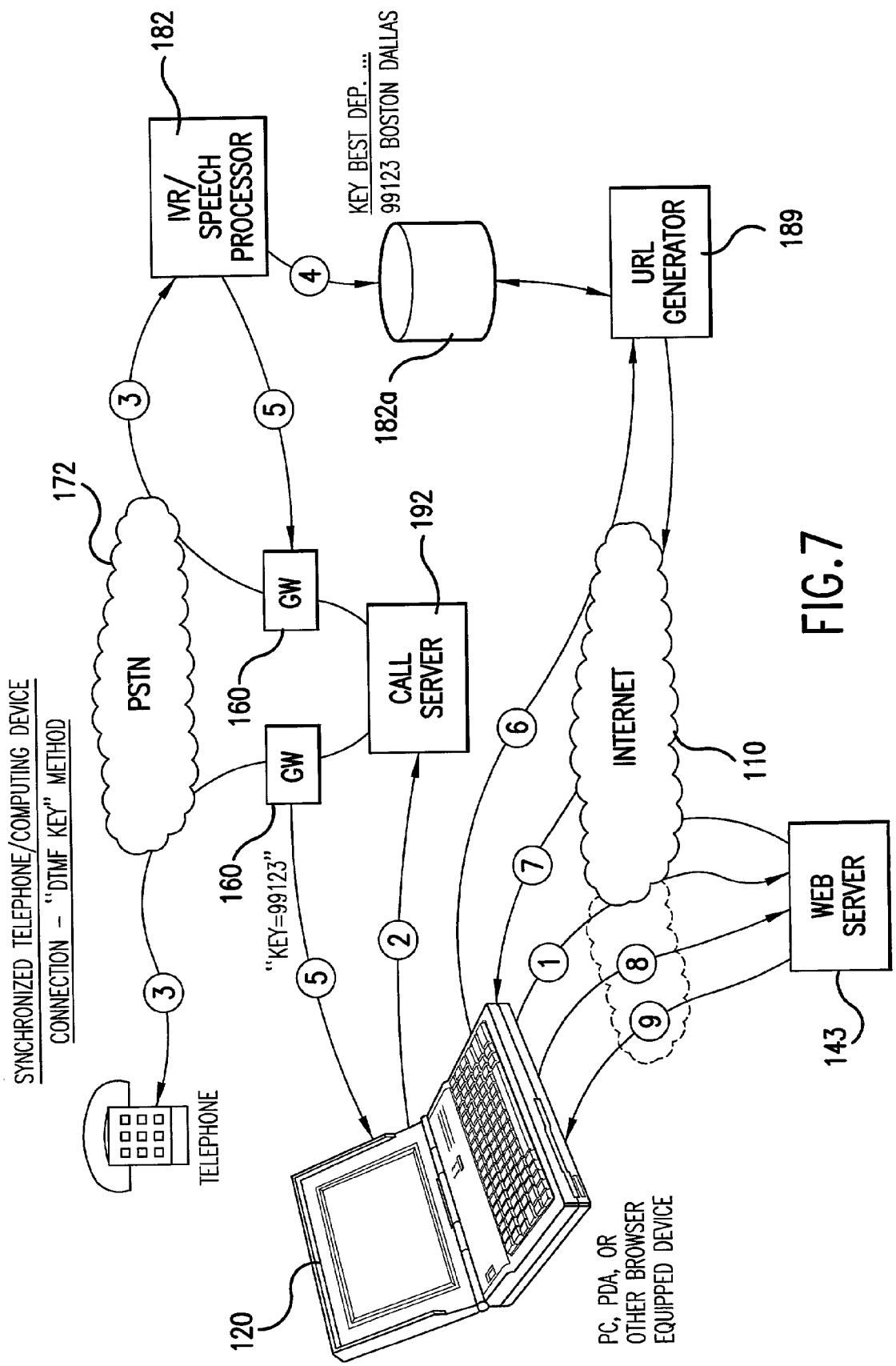
FIG. 7 is a block diagram illustrating the processing of an Internet telephone call by an automated voice processor according to a sixth embodiment of the present invention.

Another alternative processing method is shown in FIG. 7. FIG. 7 relates to a callback method of processing a call request. In this method, the end user clicks on an icon that signals the end user's desire for a merchant to call 192 the end user at step 1. At step 2, the end user is prompted to enter a telephone number for the callback and this number is sent to the call server 192. The call server then places calls to the callback number provided by the end user and to the AVP 182 at step 3. The AVP 182 queries the end user and stores the translated end user responses, which are associated with a key, in a database 182a at step 4. At step 5, the AVP 182 transmits the key to the end user 120 by generating corresponding DTMF tones. The end user 120 uses the key to request a URL from the URL generator 189 at step 6. The URL generator 189 sends the URL to the end user terminal 120 at step 7. At step 8, the end user terminal 120 sends a download request including the URL to the merchant terminal 143, and the merchant terminal 143 downloads the requested web page at step 9.

Figure 8:
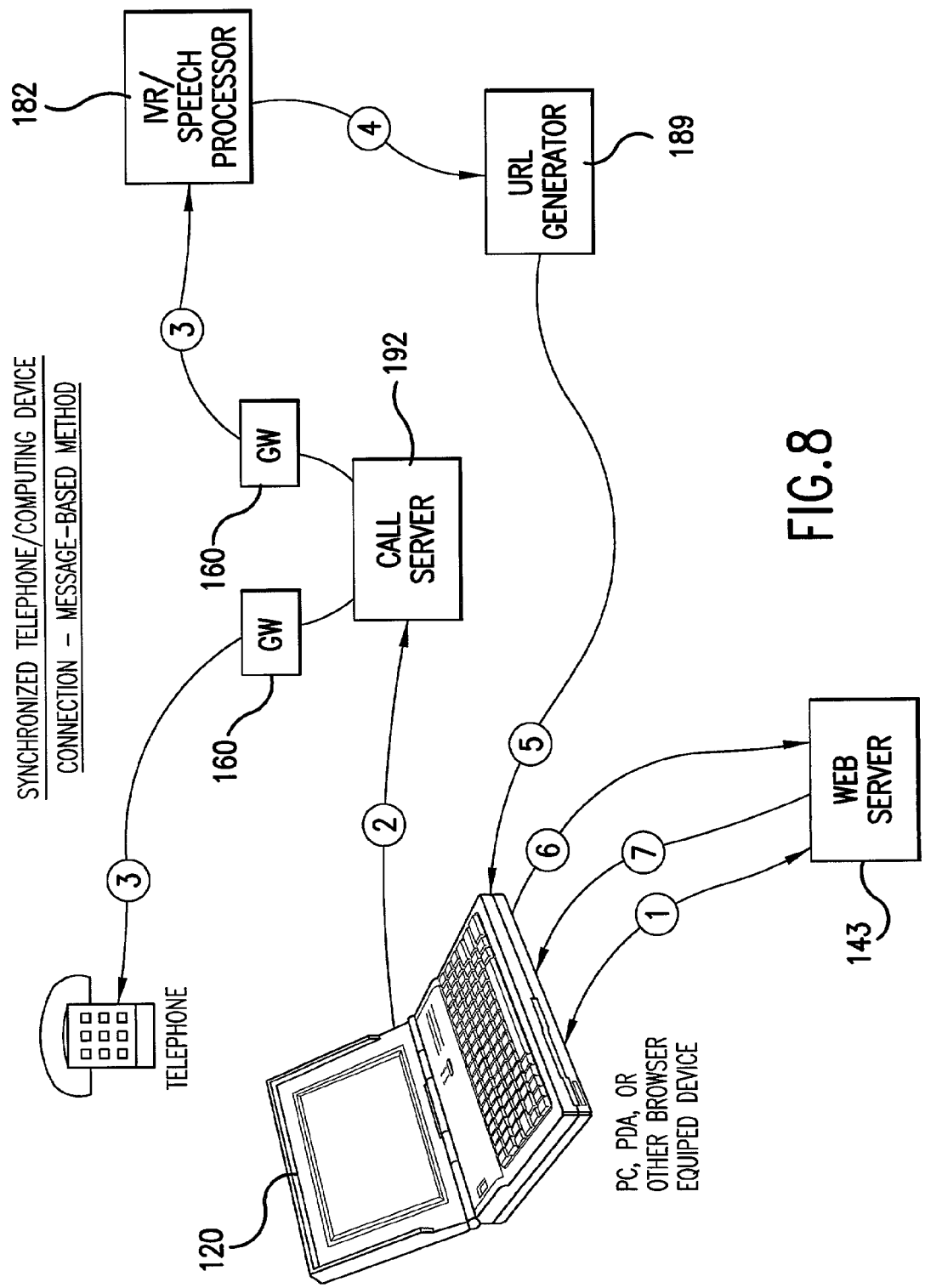
FIG. 8 is a block diagram illustrating the processing of an Internet telephone call by an automated voice processor according to a seventh embodiment of the present invention.

Yet another processing method is illustrated in FIG. 8. This method also requires that the AVP 182 be capable of determining and sending the end user IP address to the URL generator 189. The method begins when the end user clicks on an icon that signals the end user's desire for a merchant call back to the end user at step 1. At step 2, the end user is prompted to enter a telephone number for the callback and this number is sent to the call server 192. The call server 192 then places calls to the callback number provided by the end user and to the AVP 182 at step 3. At step 4, the AVP 182 relays the translated end user responses to the URL generator 189 along with the address of the end user terminal 120. The URL generator generates an appropriate web page URL and sends the corresponding URL to the end user terminal 120 at step 5. At step 6, the end user terminal 120 sends a download request message to the web merchant server 143 using the URL obtained in step 5. The web merchant server 143 then downloads the corresponding web page at step 7.

Figure 3:
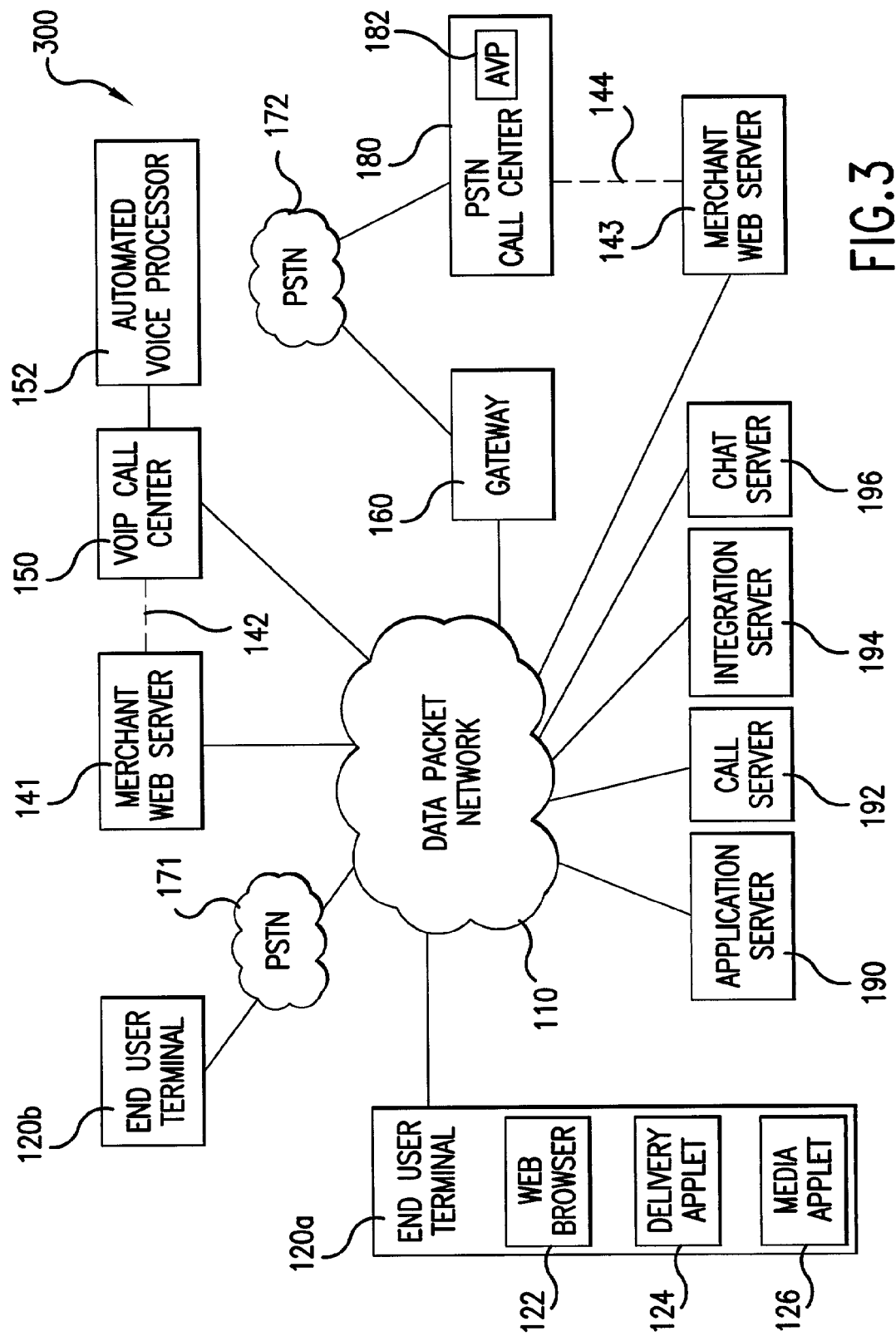
FIG. 3 is a block diagram illustrating an exemplary communication system according to a third embodiment of the present invention.
Figure 4:
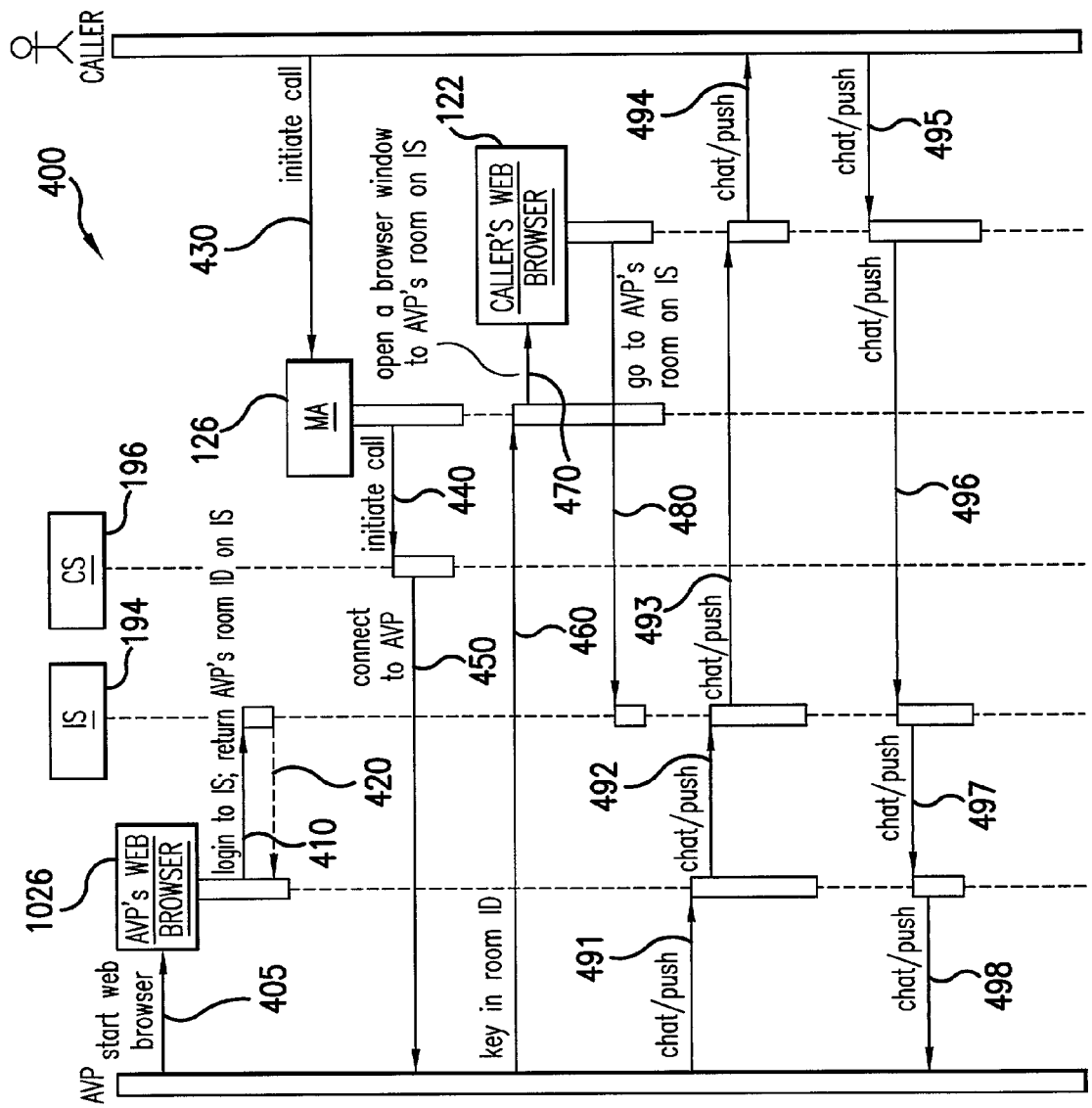
FIG. 4 is a sequence diagram illustrating steps involved in establishing communications through a chatroom according to the embodiment of FIG. 3.

Yet another strategy for controlling a display at the terminal 120 and/or synchronizing displays at the terminal 120 and an agent terminal at the call center 180 is illustrated by the system 300 of FIG. 3 and the sequence diagram 400 of FIG. 4. In this embodiment, an AVP 182 logs on to a chat server 196 at step 410. When the AVP 182 logs on, the chat server 196 returns a chatroom ID, which is preferably a short (e.g., 2–4 digit) numeric code, at step 420. In preferred embodiments, this chatroom ID corresponds to one of a number of chatrooms hosted on the integration server 194. The foregoing preferably occurs before any calls are handled by the AVP 182.

Next, an end user viewing a web page from merchant web server 143 clicks on an Internet telephony icon at step 430.

This initiates a call to call center 180 at step 440. When the call is routed through an ACD (automatic call distributor) at the call center to the AVP 182 at step 450, the AVP 182 causes DTMF signals corresponding to the chatroom ID to be generated, which are to be transmitted to the media application 126. (In alternative embodiments, the DTMF signals are detected at the gateway 160 and translated into a message which is sent to the terminal 120.) The media application 126 recognizes the DTMF signals as a chatroom ID and opens a new browser window at step 470. Next, the digits represented by the signals are appended to a predetermined URL portion (e.g., the predetermined URL portion forms the first part of the URL and the chatroom ID is appended as "/xx" where "xx" is a two digit chatroom ID) to form a chatroom URL and the newly-opened web browser window is directed to the corresponding chatroom at step 480. The AVP 182, which also knows the address of the chatroom based on the DTMF code, may then send information to the caller through the chatroom on the integration server 194 at steps 491–494, and the caller may send information to the AVP 182 at steps 495–498 (one situation which it might be useful for a caller to send chat information to the AVP 182 is when the AVP 182 cannot recognize a spoken response; in this situation, the caller can type the response, and the AVP 182 can process the typed response instead of a spoken response.) This information may comprise standard chat messages. This information may also include web push information—that is, commands including URLs that cause the terminal to request web pages corresponding to the URLs to be downloaded in the manner described above.

It should be recognized that the foregoing technique is not limited to exchanging chatroom messages and/or facilitating web pushes. Any kind of information may be exchanged. For example, this technique could be used to set up a channel to allow the terminal 120 to send cookie information, or other information that identifies the caller, to the AVP 182.

It is not necessary to utilize a chatroom to facilitate communications between the end user and the agent. As an alternative to such embodiments, in which a chatroom hosted on an intermediate computer is used to synchronize the displays of the parties to the call, a direct communications channel such as an SSL socket could be established between the end user and the AVP 182. For example, the DTMF signals (whether detected at the gateway and sent to the end user computer by the gateway through the data packet network or detected at the end user computer itself from decoded voice packets received from the gateway) could form a portion of a URL associated with the AVP 182 agent to which a socket request is sent. In this case, modifications to the customer call center may be necessary to make the association between the DTMF code entered by the AVP 182 and the URL. One simple way this can be achieved is by permanently assigning each AVP 182 to one of the channels corresponding to the DTMF code. The AVP 182, upon receiving a call, simply enters the corresponding DTMF code. Upon detection/receipt of the DTMF code, the end user terminal 120 sends a socket request to the URL formed in part by the DTMF code, which corresponds to the agent terminal.

Controlling the end user's display in a pure Internet telephony embodiment may be performed in a simpler (relative to the above-described methods), more direct manner. For example, referring now back to FIG. 2, when a call is made to the VoIP-ready call center 150, the AVP 152 system therein sends a display code (rather than DTMF tones) to the terminal 120 (possibly through the call server 192 or the integration server 194). When the display code is received at the terminal 120, it is included in a download ( ) message sent to the merchant web server 141. The web page corresponding to the display code is then displayed at the terminal 120. Of course, more direct routes are also possible, especially where the web server 143 is in communication with the CRM system at the call center 150.

In some embodiments of the invention, some portion of the speech recognition software may be downloaded to the end user terminal 120 if sufficient processing cycles are available there. This has the potential of reducing distortions that may result using codecs that are optimized for the human ear rather than for speech recognition software.

It will be appreciated by those of skill in the art that the functions performed by the application server 190, the call server 192, the integration server 194, the chat server 196, and/or the gateway 160 may be performed by a single physical device as a single process or as one or more separate processes, or may be performed in separate physical devices. Also, sets of instructions described herein as applets could be implemented as applications (executables), and vice-versa. It should be understood that, although the preferred embodiments discussed herein are particularly useful in the realm of e-commerce, they have broader application. For example, the techniques discussed herein can be applied to general purpose Internet telephony applications, to Internet telephony conference call applications, as well as man) other applications.

Obviously, numerous modifications and variations of the present invention are possible in light of the above teachings. It is therefore to be understood that the invention may be practiced otherwise than as specifically described herein.

What is claimed is:

1. A method for communicating comprising the steps of:
accepting a callback request from a user associated with a user computer over a packet switched network, the callback request including a telephone number at which the user wishes to be called;
calling the user over the public switched telephone network and connecting the user to an automated voice processing system;
requesting information from the user;
translating words spoken by the user to textual information at the automated voice processing system;
storing the textual information at a first server;
associating an identifier with the textual information;
transmitting identifier packets containing dual tone multi-frequency tones corresponding to the identifier to the user computer via the packet network;
converting the dual tone multi-frequency tones to the identifier at the user computer;
issuing a download request comprising a uniform resource locator from the user computer to a second server via the packet network, the download request including the identifier;
transmitting a web page from the second server to the user computer, the web page including the textual data.

2. The method of claim 1, wherein the first server and the second server are a single physical device.

3. A method for conducting a phone call over a packet network comprising the steps of:
logging onto a chat server by an automated voice processor;
receiving a chatroom identifier at the automated voice processor;
requesting information from a user;

translating, at a user computer, words spoken by the user in response to the request into response packets of digital data representing the words spoken by the user;

transmitting the response packets to an automated voice processing system via a packet network;

translating the response packets to textual information at the automated voice processing system;

transmitting identifier packets containing dual tone multi-frequency tones corresponding to the chatroom identifier to the user computer via the packet network;

converting the dual tone multi-frequency tones to the chatroom identifier at the user computer;

opening a browser window to the chatroom using the identifier at the user's computer;

exchanging information between the user and the automated voice processor through the chatroom.

4. The method of claim 3, wherein the information exchanged through the chatroom includes standard chat messages.

5. The method of claim 3, wherein the information exchanged through the chatroom includes a URL sent to the end user computer.

6. The method of claim 5, wherein the end user computer is further configured to issue a download request including the URL.

7. The method of claim 3, wherein the information exchanged through the chatroom includes a cookie.

8. The method of claim 3, wherein the information exchanged through the chatroom includes an end user identifier.

9. A device for communications, the device comprising:

an automated voice processor;

a call server, the server being configured to accept a callback request from a user over a packet network, the user being associated with a user computer, the callback request including a telephone number at which the user wishes to be called;

a storage device connected to the automated voice processor;

a uniform resource locator (URL) generator connected to the storage device;

a web server configured to communicate with the user computer; and a user computer;

wherein the call server is configured to connect a telephone call via at least one gateway between a telephone corresponding to the telephone number included in the callback request and the automated voice processor;

wherein the automated voice processor is configured to request information from the user, translate words spoken by the user to textual information, store the textual information in the storage device, associate the textual information with an identifier, and transmit identifier packets including dual tone multi-frequency tones corresponding to the identifier to the user computer via a gateway;

wherein the URL generator is configured to incorporate the textual information stored in the storage device into a URL and provide the URL to the end user computer in response to a message from the end user computer including the identifier; and wherein the user computer is configured to convert the dual tone multi-frequency tones to the identifier, send a message to the URL generator including the identifier to obtain the URL, issue a download request comprising the URL obtained from the URL generator to a web server via the packet network, the download request including the identifier, and display a web page received from the web server to the user, the web page including the textual information.

10. The device of claim 9, wherein the call server, the URL generator and the web server are a single physical device.

11. A device for conducting a phone call over a packet network, the device comprising:

an integration server for hosting a chatroom;

an automated voice processor;

a call sever; and an end user computer associated with an end user;

wherein the call server is configured to receive a message from the end user computer indicating that a call to a third party is desired and establish a voice over internet protocol phone call between the end user computer and the automated voice processor upon receipt of the message, the automated voice processor being associated with the third party;

wherein the integration server is configured to host a chatroom and provide a chatroom identifier to the automated voice processor when the automated voice processor logs in to the integration server;

wherein the automated voice processor is configured to receive the chatroom identifier from the integration server, transmit identifier packets containing dual tone multi-frequency tones corresponding to the chatroom identifier to the user computer via the packet network after the phone call is established, request information from the end user computer after the phone call is established, and translate response packets received from the end user computer containing responses to the request for information into textual information;

wherein the end user computer is configured to translate words spoken by the user in response to the request for information from the automated voice processor into response packets of digital data representing the words spoken by the user, transmitting the response packets to an automated voice processing system via a packet network; convert the dual tone multi-frequency tones received from the automated voice processor to the chatroom identifier; open a browser window to the chatroom using the identifier, and exchange information between the user and the automated voice processor through the chatroom.

12. The device of claim 11, wherein the information exchanged through the chatroom includes standard chat messages.

13. The device of claim 11, wherein the information exchanged through the chatroom includes a URL sent to the end user computer.

14. The device of claim 13, wherein the end user computer is further configured to issue a download request including the URL.

15. The device of claim 11, wherein the information exchanged through the chatroom includes a cookie.

16. The device of claim 11, wherein the information exchanged through the chatroom includes an end user identifier.

* * * * *